(No Model.)  3 Sheets—Sheet 1.

F. BAYERDOERFER.
APPARATUS FOR RECORDING SPEED OF VEHICLES.

No. 531,147.  Patented Dec. 18, 1894.

WITNESSES:
D. Potte Palmer
H. R. Brennan

INVENTOR
Frank Bayerdoerfer
BY
Joseph Raegener
ATTORNEYS.

(No Model.) 3 Sheets—Sheet 2.
F. BAYERDOERFER.
APPARATUS FOR RECORDING SPEED OF VEHICLES.
No. 531,147. Patented Dec. 18, 1894.
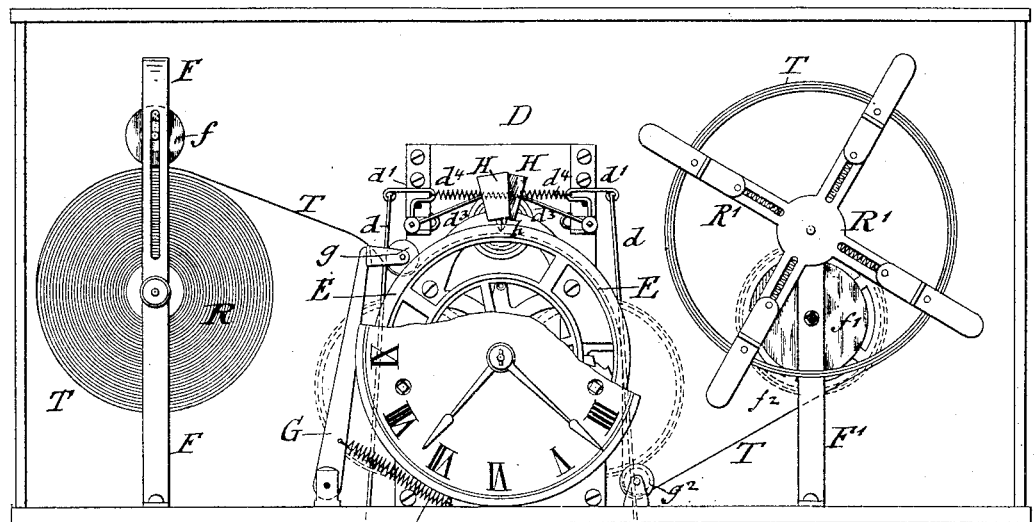
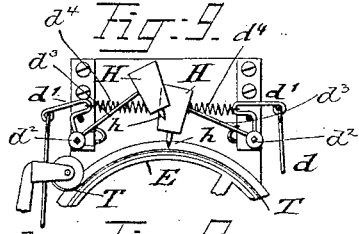
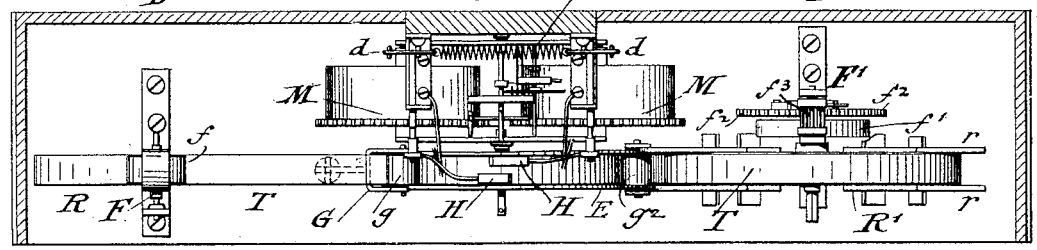
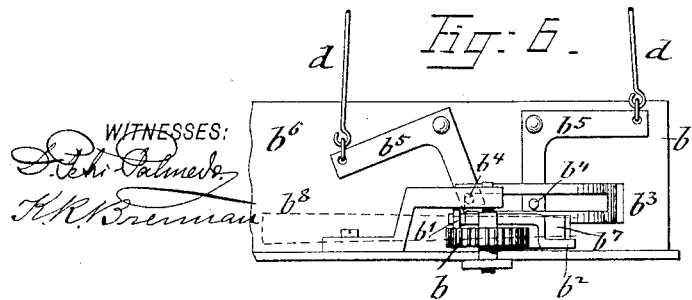
WITNESSES:
INVENTOR
Frank Bayerdoerfer
BY
ATTORNEYS.

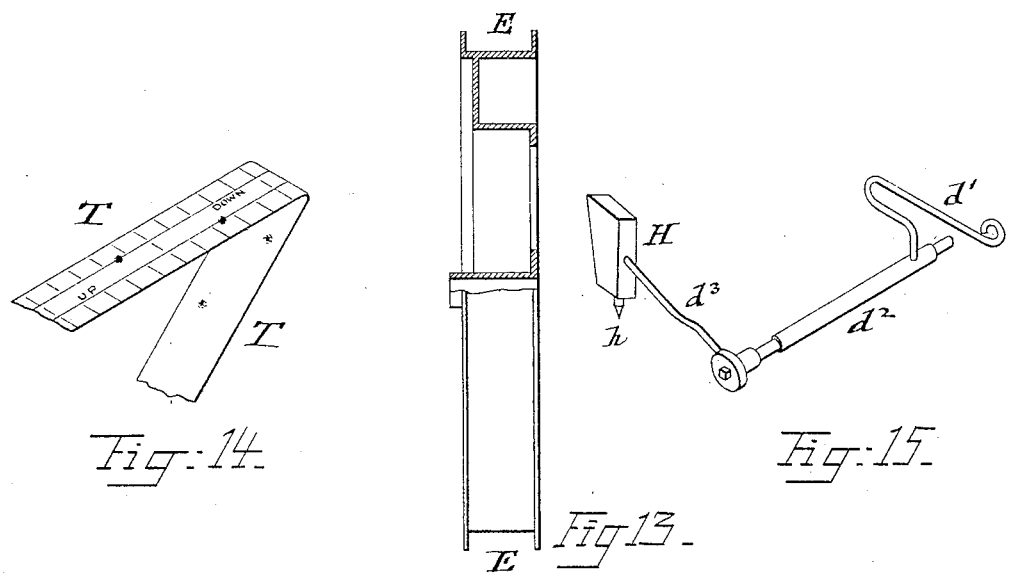

a# UNITED STATES PATENT OFFICE.

FRANK BAYERDOERFER, OF BROOKLYN, NEW YORK.

APPARATUS FOR RECORDING SPEED OF VEHICLES.

SPECIFICATION forming part of Letters Patent No. 531,147, dated December 18, 1894.

Application filed February 9, 1894. Serial No. 499,657. (No model.)

*To all whom it may concern:*

Be it known that I, FRANK BAYERDOERFER, a citizen of the United States, residing in the city of Brooklyn, county of Kings, and State of New York, have invented certain new and useful Improvements in an Apparatus for Recording the Speed of Vehicles, of which the following is a specification.

This invention has reference to an improved device for recording the speed of trolley-cars, cable-cars, cabs, and other vehicles so as to determine thereby in a reliable and effective manner that the vehicle has not been run beyond the maximum-speed permitted by law.

A great many accidents are caused by cars and other vehicles when run at too great a speed, and it is necessary in many cases, especially in cases of accidents, to determine whether the maximum-speed has been exceeded or not, and to fix the responsibility of the railway company and other owners of vehicles toward the public.

The object of this invention is to furnish a speed-recording device for trolley-cars and other vehicles, by which the speed of any car or vehicle at any point of its trip is recorded in such a manner, that it can be ascertained accurately at any desired time.

The invention consists of an apparatus for recording the speed of trolley-cars and other vehicles, which comprises an actuating device located below the bottom of the vehicle and operated by a worm-gear on the axle of the same, a clock-movement located in the vehicle and adapted to operate a flanged ring, a recording-tape that is supported at one side of the clock-movement and guided over said flanged ring to a winding-up reel, spring-actuated hammers which are provided with marking-points or pins and raised intermittently by the action of the actuating-mechanism below the car, and rods by which the marking-hammers are connected with the actuating mechanism, so as to be operated whenever the vehicle has moved through a certain distance.

The invention consists further of certain details of construction and novel combination of parts, which will be fully described hereinafter and finally pointed out in the claims.

Figure 1:
Figures 2, 4, 5:
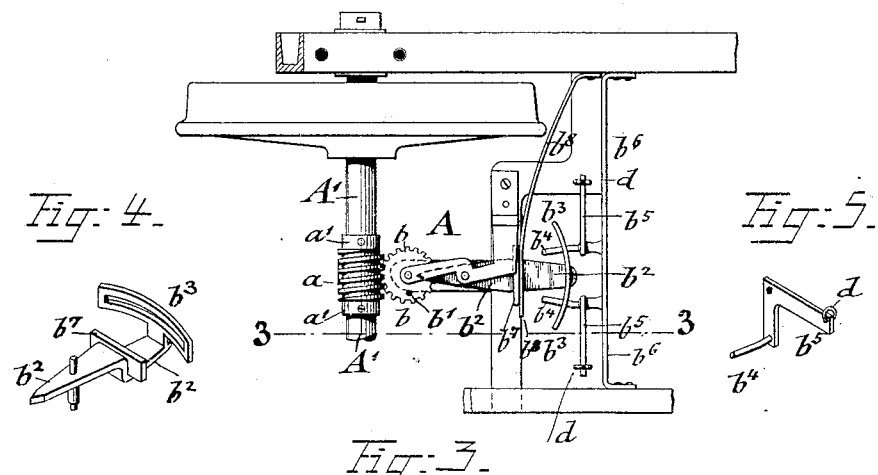
Figure 3:
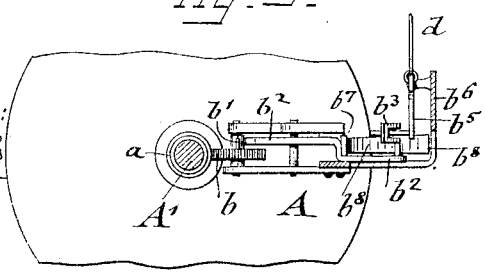

In the accompanying drawings, Figure 1 represents a perspective view of a portion of a trolley or other car with a portion of the bottom broken out, so as to show the actuating-mechanism and the relative position of the recording apparatus toward the same. Fig. 2 is a plan-view of the actuating mechanism of the recording apparatus, drawn on a larger scale and supported on the frame of the car-bottom. Fig. 3 is a vertical longitudinal section on line 3—3, Fig. 2. Figs. 4 and 5 are detail perspective views of individual parts of the actuating-mechanism, shown in Figs. 2 and 3. Fig. 6 is an elevation of the actuating-mechanism drawn on a somewhat larger scale than Figs. 2 and 3. Fig. 7 is a front elevation, with a part of the dial of the clock-movement broken away, of the apparatus for recording the speed of the car or other vehicle. Fig. 8 is a plan-view of the apparatus shown in Fig. 7, partly in section through the inclosing casing of the same. Fig. 9 is a detail front-view of the intermittently-actuated marking-hammers, in which one of the hammers is shown in the act of striking. Fig. 10 is a sectional rear-elevation of the winding-up reel for the recording-tape. Figs. 11 and 12 are details of the winding-up reel. Fig. 13 is a vertical transverse section of the flanged guide-ring for the recording-tape. Fig. 14 is a perspective view of a portion of the recording-tape; Fig. 15, a detail perspective view of one of the marking-hammers and its arbor, and Fig. 16 is a detail vertical section of the tape-holding ring of the winding-up reel.

The same letters of reference indicate the same or corresponding parts.

Referring to the drawings, A represents the actuating mechanism of my improved speed-recording device for trolley-cars and other vehicles. The actuating-mechanism is supported on the bottom-frame of the car or other vehicle and operated by a worm $a$ that is arranged on a sleeve $a'$ which is attached to the axle $A'$ of the car or vehicle. The worm $a$ meshes with a worm-wheel $b$, the shaft of which is supported in suitable bearings of the car-frame. The transmitting worm-wheel $b$ is provided with a projecting-pin $b'$ which engages the tapering end of a fulcrumed lever $b^2$ that is provided at its opposite end with a slotted arc-shaped plate $b^3$ as shown clearly in Figs. 2, 4, and 6. The slotted plate $b^3$ is engaged by pins $b^4$ on the lower arms of bell-crank levers $b^5$ which are fulcrumed to a transverse plate $b^6$ of the supporting-frame, as shown in Figs. 5 and 6. The transmitting lever $b^2$ is provided about midway of its length with a shoulder to which a straight plate $b^7$ is attached, said plate serving as a rest for the free end of a flat spring $b^8$ which is attached at its opposite end to the car-frame. The free end of the flat spring $b^8$ presses on the flat contact-plate $b^7$ and serves to keep the fulcrumed lever $b^2$ in its central position at right angles to the car-axle, as shown in Fig. 2.

The upper arms of the bell-crank levers $b^5$ are connected either directly by means of rods or chains or indirectly by means of steel-cables and pulleys with the speed-recording device D proper, which is located at the inside of the car or vehicle and preferably in the front-wall of the same, as shown in Fig. 1. Whenever the car or other vehicle is moved over a certain distance of the track, say one hundred feet or multiples of the same, the axle has made a sufficient number of rotations to produce a full rotation of the worm-wheel $b$, which engages then by its pin $b'$ the tapering end of the fulcrumed transmitting lever $b^2$ and produces the oscillation of the same against the tension of its spring $b^8$ until the slot of the arc-shaped plate $b^3$ engages the projecting pin $b^4$ of one of the bell-crank levers $b^5$ so as to oscillate the same and produce thereby the actuation of the speed-recording device. As soon as the pin $b'$ has released the end of the transmitting lever $b^2$, the latter is returned by its spring $b^8$ into its central or normal position until it is oscillated again by the next rotation of the worm-gear, and so on.

The rods, chains, or wires $d$, by which the bell-crank levers $b^5$ are connected with the speed-recording device D, are preferably arranged in the front-wall of the car or other vehicle, and are connected at their upper ends with looped arms $d'$ (as seen in Fig. 9) which are attached to the rear-ends of the arbor $d^2$ of the marking-hammers H, the shanks $d^3$ of which are attached to the front ends of the arbors $d^2$, as shown in Fig. 15. Each marking-hammer H is provided at its lower part with a pointed pin or stylus $h$, so as to produce a mark on a recording-tape T which is passed below the intermittently-actuated marking-hammers H over a flanged guide-ring E that is located by its hub on the arbor "$e$", of the minute-hand, the circumference of said ring being equal to one foot in length, so that for every five minutes the guide-ring E moves through a one-twelfth part of its circumference, or in other words for one inch. The guide-ring E is set in motion with the minute hand by a clock movement M of any approved construction, which is arranged back of the guide-ring E and which is preferably provided with two spring drums, so that the clock-movement is adapted to run at least for a week.

The marking-hammers H are arranged vertically above the rotating guide-ring E on a suitable supporting-frame that extends above the clock movement, the arms $d'$ of the marking-hammers being connected by a suitable spring $d^4$, so that the hammers are returned into position after the same are raised by the action of the actuating-mechanism A and the connecting-rods $d$. Two marking-hammers and connecting mechanisms $d, d', d^2, d^3$ are arranged, so that the marking of the recording tape can take place whether the vehicle is moving in one direction or in the opposite direction, one marking-hammer being in operation when the vehicle is moving in one direction and the other when it is moving in the opposite direction.

As the car moves in one direction, the worm-wheel $b$ is revolved thereby so as to cause the trip-pin $b'$ to engage one side of the lever $b^2$ and rock the lever one way, thus actuating, through its corresponding bell-crank lever and pull-rod, one of the marking hammers H; while as the car moves in the opposite direction, the movements of the worm-wheel $b$ and lever $b^2$ are reversed and the other marking hammer is operated.

The recording-tape T is preferably printed along both edges with a suitable graduation, such as feet, inches, and subdivisions of the latter, as shown clearly in Fig. 14, one graduation serving for recording the speed of the car when riding in one direction, while the other graduation serves to record the speed of the car when moving in the opposite direction. The recording-tape T is supplied on reels R in suitable lengths, so that it lasts for some time, say three days or longer, according to the time for which the car or other vehicle is in service. This reel is supported on a reel-stand F, which is attached to the bottom of the supporting-casing D' by which the speed-recording apparatus is inclosed, the reel-stand F being located at the left-hand side of the speed-recording device proper. The upper part of the reel-stand F is slotted so as to guide the axle of a weighted tension-roller $f$, which presses on the tape and keeps the same at the proper degree of tension. From the reel R the tape passes below a guide-roller $g$ that is pivoted to the upper forked end of an arm G the lower end of which is pivoted to the bottom of the casing and which is acted upon by a helical spring $g'$ that is attached to the arm G and to the bottom of the inclosing casing D'. The tape T passes from the guide-roller $g$ over the upper part of the guide-ring E and then in downward direction around a second guide-roller $g^2$ which is located at the opposite side of the guide-ring E, but near the bottom of the casing D'. The tape T passes then from the lower guide-roller $g^2$ to a winding-up reel R', which is supported on a suitable stand F' that is attached to the bottom of the casing D', at the right-hand side of the recording-device D. The winding up reel R′ is actuated by a coil-spring which is located in a spring-drum $f'$ which is wound up from time to time like the clock-movement M, the motion of said spring-drum $f'$ being transmitted by a gear-wheel $f^2$ keyed to its shaft to a pinion $f^3$ on the reel-shaft the arbor of the spring-drum being further provided with a ratchet-wheel $f^4$ which is engaged by a spring-pawl $f^5$ on the gear-wheel $f^2$, so as to permit the winding up of the coil-spring of the drum in the usual well-known manner.

The winding-up reel R′ is composed of a circular band $R^2$ having overlapping ends as shown in Figs. 10 and 16, said band being supported on radial arms of the reel-frame. The arms are provided with slots for guiding U-shaped keepers $r$ which extend beyond the band $R^2$ and serve for the winding-up of the recording-tape T around the band $R^2$. The inner ends of the keepers $r$ are acted upon by helical springs $r'$ that are set into socket-holes $r^2$ of the central portion or hub of the reel-frame.

The tension exerted by the spring-drum $f^2$ on the band $R^2$ of the reel R′ produces the gradual winding-up of the recording-tape, after the end of the same has been attached to the overlapping ends of the band, as the same is fed toward the winding-up reel by the motion of the guide-ring E. The radial-spring actuated keepers $r$ serve to produce the even winding-up of the tape on the supporting-band $R^2$ and to retain the wound up tape on the band. The proper tension of the recording-tape is produced by the tension roller of guide-roller $g$ $g^2$ and the rotary motion of the winding-up reel, so that the recording-tape is moved with the guide-ring toward the winding-up reel until every portion of the tape has passed over the recording-device and is wound up on the winding-up-reel. From time to time after each rotation of the wound-up reel of the actuating mechanism A, the hammer H is lifted and dropped and thereby a mark recorded on the tape T.

When it is desired to remove the wound-up tape from the winding-up reel, one of the radial U-shaped keepers $r$ after another is moved inwardly against the tension of its spring, so that the wound-up tape is cleared by the same and can be readily removed from the band $R^2$, so as to be delivered to and filed by the owners of the cars or vehicles. Another tape is then inserted into the recording-apparatus, passed below the guide-rollers, the end being placed between the overlapping ends of the supporting-band $R^2$, after which the new tape is in position for being marked by the hammers.

It is obvious from the foregoing that the tape is moved forward by the clock-movement independently of the actuating-mechanism of the marking-hammers. When the car is at a stand-still, the actuating-mechanism is at rest and no marking of the tape takes place. Consequently it is fed over the guide-ring E to the winding-up reel without any marks of the marking-hammer. As soon as the car or other vehicle is set in motion, the marking-hammer is again operated intermittently so as to strike the recording-tape and form a depression on one side or the other of the same. When the car is moving at a regular speed these depressions are produced at regular intervals of time. When the car is moving at a slow speed, the depressions are produced on the tape at a greater distance from each other and at longer intervals of time, while when the car is moving at a greater speed, the depressions are produced closer together and at shorter intervals of time. The tape therefore forms a reliable record of the speed of the car throughout every trip of the same, whether the same is moving in one or the opposite direction. In this manner the speed of the car or vehicle at any point during any one of its trips can be readily ascertained and thereby the motor-man or driver of the same controlled in an effective and reliable manner, so that he tries his very best to run the car or other vehicle as closely as possible to the speed required and avoid thereby too great departures from the average speed.

Whenever the wound-up tape is removed from the speed-recording device, the same is marked with the number of the car or vehicle, and the dates during which it was used, and filed away, so that whenever it is required to ascertain the speed-record of any car or vehicle at a later time, it can be accomplished by an examination of the corresponding recording-tape.

By providing the clock-movement of the speed-recording device with a dial and hands, the device forms also a convenient time-keeper for each vehicle. The recording-device forms a very useful means for controlling the employés on the one hand, and a means on the other hand for protecting the public against running the vehicles at too great speed.

Having thus described my invention, I claim as new and desire to secure by Letters Patent—

1. The combination with an actuating-mechanism located below the bottom of the car or vehicle and actuated by the axle of the same, of a speed-recording device located in the car or vehicle and composed of a clock-movement, a guide-ring rotated by the same, a recording-tape, means for passing the same over the guide-ring, spring-retracted marking-hammers above the tape and pull-rods connected with the actuating-mechanism and said hammers and adapted to depress said hammers against the action of their springs, substantially as set forth.

2. The combination with an actuating-mechanism located below the bottom of the car or vehicle and actuated by the axle of the same, said actuating-mechanism comprising a fulcrumed lever adapted to be rocked by the axle, and bell-crank levers engaged by said lever, of a speed-recording device located in the car or vehicle and composed of a clock-movement, a guide-ring rotated by the same, a recording-tape passed over the guide-ring, means for moving said recording-tape, spring-retracted marking-hammers above the tape and pull-cords connected with said bell-crank levers and said hammers, substantially as set forth.

3. The combination of a speed-recording device located in the car, with an actuating-mechanism below the bottom of the car, and means for connecting the speed-recording device with the said actuating-mechanism, which latter consists of a worm-gear operated by the car-axle, a fulcrumed and spring-actuated lever operated intermittently by the worm-gear, bell-crank levers and means in connection with the lower arms of the bell-crank levers and said spring-actuated lever for causing the movement of said bell-crank levers, the upper arms of the bell-crank levers being applied to the connections of the actuating-mechanism with the speed-recording device, substantially as set forth.

4. The combination with a speed-recording device located in the car, with an actuating-mechanism below the bottom of the car, and means for connecting the speed-recording device with said actuating-mechanism, which latter consists of a worm-gear operated by the car-axle, a fulcrumed and spring-actuated lever operated intermittently by the worm-gear, a slotted plate on said fulcrumed lever, and bell-crank levers, the lower arms of which are provided with pins that engage said slotted plate, while the upper arms are applied to the connections of the actuating-mechanism with the speed-recording device, substantially as set forth.

5. The combination of a speed recording device located in the car, with an actuating-mechanism below the bottom of the car, and means for connecting the speed-recording device with said actuating-mechanism, which latter consists of a worm mounted on the car-axle, a worm-wheel engaged by the worm and provided with a trip-pin on one face, a fulcrumed and spring-actuated lever operated intermittently by the trip-pin, bell-crank levers and means in connection with the lower arms of the bell-crank levers and said spring-actuated lever for causing the movement of said bell-crank levers, the upper arms of the bell-crank levers being applied to the connections of actuating-mechanism with the speed-recording device, substantially as set forth.

6. A speed-recording device consisting of a clock-movement, a guide-ring rotated by said clock-movement, a recording-tape fed over said guide-ring, a winding-up reel for the recording-tape, a spring-drum for actuating said winding-up reel, spring-retracted marking-hammers located above the upper part of the guide-ring and means connected with the marking-hammers whereby they are caused to mark the tape when the vehicle is moving in one or the opposite direction, substantially as set forth.

7. The combination of a clock-movement, a guide-ring rotated by said clock-movement, a recording-tape passed over said guide-ring, a spring-actuated arm located on one side of the guide-ring and provided with a guide-roller at its upper end under which the tape passes, and a second guide-roller located at the other side of said guide-ring, intermittently actuated marking-hammers located sidewise of each other above the guide-ring, means for actuating said hammers when the vehicle is moving in one or the opposite direction, and a spring-actuated winding-up reel for the recording-tape, substantially as set forth.

8. The combination, with a speed-recording device composed of a clock-movement, a guide-ring rotated by the same, and intermittently operated marking-hammers, of a recording-tape passing over said guide-ring, guide-rollers for said tape, and a winding-up reel composed of a reel-frame, a supporting band for the tape on said reel-frame, radially-guided and spring-actuated keepers for the tape and a spring-drum for actuating the reel-frame and winding-up the tape as the same is fed by the speed-recording device, substantially as set forth.

In testimony that I claim the foregoing as my invention I have signed my name in presence of two subscribing witnesses.

FRANK BAYERDOERFER.

Witnesses:
PAUL GOEPEL,
K. R. BRENNAN.